United States Patent

Obata et al.

[11] Patent Number: 5,674,920
[45] Date of Patent: Oct. 7, 1997

[54] FLEXIBLE HIGH RESILIENCE POLYURETHANE FOAM

[75] Inventors: Masashi Obata; Seijiro Sakai; Kaoru Ueno, all of Kanagawa-ken, Japan

[73] Assignee: Mitsui Toatsu Chemicals, Inc., Tokyo, Japan

[21] Appl. No.: 558,983

[22] Filed: Nov. 16, 1995

[30] Foreign Application Priority Data

Dec. 8, 1994 [JP] Japan .................. 6-304593
Dec. 8, 1994 [JP] Japan .................. 6-304594

[51] Int. Cl.$^6$ .................. C08G 18/06; C08J 9/08
[52] U.S. Cl. .................. 521/159; 521/160; 521/174; 521/176
[58] Field of Search .................. 521/159, 160, 521/174, 176

[56] References Cited

U.S. PATENT DOCUMENTS

| | | | |
|---|---|---|---|
| 5,132,334 | 7/1992 | Gansen et al. | 521/160 |
| 5,389,693 | 2/1995 | De Genova et al. | 521/160 |
| 5,416,125 | 5/1995 | Limou et al. | 521/160 |
| 5,436,277 | 7/1995 | Narayan et al. | 521/160 |
| 5,491,252 | 2/1996 | Narayan et al. | 521/160 |
| 5,510,053 | 4/1996 | Narayan et al. | 521/160 |
| 5,530,034 | 6/1996 | Narayan et al. | 521/160 |
| 5,532,403 | 7/1996 | Narayan et al. | 521/160 |
| 5,539,010 | 7/1996 | Narayan et al. | 521/160 |

*Primary Examiner*—Morton Foelak
*Attorney, Agent, or Firm*—Burns, Doane, Swecker & Mathis

[57] ABSTRACT

A flexible high-resilience polyurethane foam which has improved impact resilience and compression set, excellent effect on the reduction of transmissibility at 6 Hz and also improved mechanical strengths even under a reduced amount of a catalyst and is prepared by using, as an organic polyisocyanate composition, a mixture having a specified ratio of tolylene diisocyanate to polymethylenepolyphenyl isocyanate having a specific benzenoid composition or by using an isocyanate terminated prepolymer obtained by reacting the mixture with polyoxyalkylene polyol which has specific structure and is used for modification, and by using polyalkylene polyol which satisfies specific conditions in a hydroxyl value, monool content, and head-to-tail coupling selectivity; and a preparation process of the flexible high resilience polyurethane foam.

16 Claims, No Drawings

FLEXIBLE HIGH RESILIENCE POLYURETHANE FOAM

BACKGROUND OF THE INVENTION

1. Field of the Invention

The present invention relates to a flexible high resilience polyurethane foam and a process for preparing the same. More particularly, the invention relates to a water blown flexible polyurethane foam which is broadly used for automotive cushion interiors, head rests and furniture cushions, and a process for preparing the same. Specifically, the invention relates to a water blown flexible polyurethane foam which is excellent in mechanical strength, durability and riding comfort even under a reduced amount of the catalyst in preparing the foam and a process for preparing the same. The flexible high resilience polyurethane foam of the invention is suited for various cushioning materials, cushion interiors for vehicle in particular.

2. Description of the Related Art

Conventionally, flexible polyurethane foams have been prepared by the reaction of an organic polyisocyanate composition with a resin premix obtained by mixing an active hydrogen containing compound such as polyoxyalkylene polyol with a blowing agent, catalyst, surfactant and other auxiliary agents.

The organic polyisocyanate composition which has been used for preparing the flexible polyurethane foam consists of tolylene diisocyanate alone or a mixture of 95 to 50% by weight of tolylene diisocyanate and the remainder of polymethylene polyphenyl isocyanate (Japanese Laid-Open Patent SHO 62-172011). Such a TDI-high resilience system (hereinafter referred to simply as TDI-HR system) which means a formulation obtained by using tolylene diisocyanate as a primary ingredient and a foam derived from the formulation, is excellent in high impact resilience of 60 to 70% and is light weight. On the other hand, TDI has high vapor pressure and is liable to cause problems on working environment. TDI has also disadvantages of forming a large amount of flash from the face of the mold in the mold filling step and requiring a relatively long time for demolding.

In order to overcome these disadvantages, techniques have been proposed to use polymethylenepolyphenyl isocyanate in place of tolylene diisocyanate.

For example, Japanese Laid-Open Patent SHO 58-458 has disclosed a process for using a polyisocyanate composition consisting of 60 to 90% by weight of 4,4'-diphenylmethane diisocyanate, 3 to 30% by weight of 2,4'-diphenylmethane diisocyanate and the remainder of a three or more benzene ring compound of polymethylenepolyphenyl isocyanate. Japanese Laid-Open Patent SHO 63-38369 has disclosed a process for using a urethane modified polyisocyanate composition having an NCO content of 15 to 30% which is obtained by reacting a mixture consisting of 55 to 85% by weight of diphenylmethane diisocyanate and the remainder of a three or more benzene ring compound of polymethylenepolyphenyl isocyanate with a polyol having a functionality of 2 to 4 and a molecular weight of 60 to 1,500.

The MDI-high resilience system (hereinafter referred to simply as MDI-HR system) obtained by using polymethylenepolyphenyl isocyanate as a primary ingredient is excellent in view of improved working environment, enhanced demolding ability and reduction of mold flash.

The impact resilience is an index of riding comfort required for vehicle cushions and it has been a serious problem that the MDI-HR system has a low impact resilience of 55 to 65% as compared with that of the TDI-HR system. It is also quite unfavorable that the MDI-HR system has a high vibrational characteristic value of 0.8 or more in the transmissibility at 6 Hz.

Further, the above MDI-HR system used chlorofluorocarbon as an auxiliary blowing agent. However, such a blowing agent cannot be used now because of the regulation for preventing a environmental disruption due to destruction of the ozone layer. Accordingly, in the case of preparing a flexible polyurethane foam with the MDI-HR system using water alone as a blowing agent, the amount of water must be increased and a large amount of urea bond same generated as a result. The resulting polyurethane foam is inferior in physical properties such as durability (compression set) and riding comfort (impact resilience and transmissibility at 6 Hz) as compared with the foam which is prepared by using chlorofluorocarbon as an auxiliary blowing agent in combination with water. Thus, it has also been difficult to reduce the density of the foam.

Particularly, polyurethane foams used for vehicle cushions are strongly required to reduce the transmissibility of the foam at 6 Hz. This is because human internal organs are said to resonate to the 6 Hz and thus the high transmissibility of 6 Hz leads to resonance of the internal organs which provides unpleasant feeling in the course of driving the vehicle.

In order to overcome these disadvantages, for example, Japanese Patent Publication HEI 06-021148 has disclosed a process for using a polyisocyanate composition comprising 10 to 30% by weight of a three or more benzene ring compound in polymethylenepolyphenyl isocyanate and 1 to 10% by weight of tolylene diisocyanate. Japanese Laid-Open Patent HEI 4-185626 has described a process for using a polyisocyanate composition comprising 1 to 20% by weight of an isocyanate terminated prepolymer derived from tolylene diisocyanate and polyester polyol, 10 to 70% by weight of diphenylmethane diisocyanate and 89 to 10% by weight of a three or more benzene ring compound of polymethylenepolyphenyl isocyanate. These processes, however, have been difficult to provide a flexible polyurethane foam having an impact resilience of 60% or more, desirably 70% or more and transmissibility at 6 Hz of 0.8 or less, desirably 0.6 or less.

The present inventors have carried out an investigation in order to overcome the above problems. As a result, they have already found a flexible polyurethane foam having good impact resilience and transmissibility at 6 Hz by using a polyisocyanate composition obtained by mixing polymethylenepolyphenyl isocyanate which contains a two benzene ring compound of 60 to 90% by weight and is 1.1 to 20.0 in the weight ratio of a three benzene ring compound to the sum of a four benzene ring compound and the less active ingredient [three benzene ring compound]/[four benzene ring compound+less active ingredient], with tolylene diisocyanate in a weight ratio of 97/3 to 80/20 (Japanese Patent Application HEI 07-094900).

However, recently, a problem of the internal surface of a window glass become turbid at an elevated temperature, in a sealed vehicle cabin which uses flexible polyurethane foam as a cushioning material and other interiors has been noted (hereinafter referred to simply as a fogging phenomenon).

The reason of the fogging phenomenon has been variously examined and the amine type catalyst contained in the polyurethane foam has been pointed out as a source of turbidity. That is, the amine type catalyst itself which is contained in the polyurethane foam or a reaction product of the catalyst with other various additives is considered to sublime at elevated temperature and adhere to the internal surface of the window glass.

A countermeasure has been required for such a fogging phenomenon as a problem on the appearance of vehicle products and at the same time as an environmental issue in the vehicle cabin.

As a countermeasure for the problem, an attempt has been made to reduce the amount of the amine type catalyst which is used in the preparation step of the polyurethane foam. However, reduction of the amine type catalyst in the already known preparation process of the flexible polyurethane foam has led to problems because of impairment in impact resilience, compression set and transmissibility of 6 Hz and, additionally, great decrease in tensile strength, tear resistance, elongation and other mechanical strengths. The above flexible polyurethane foam which was found by the present inventors is also desired to further improve these properties.

Processes for improving the impact resilience, compression set and the transmissibility at 6 Hz of the flexible polyurethane foam has been known to use polyoxyalkylene polyol which is prepared in the presence of diethyl zinc, metal porphyrin and a composite metal cyanidation complex catalyst and has a low total unsaturation (Japanese Laid-Open Patent HEI-02-115211, 03-068620, and 03-014812). However, according to the trace experiment of the present inventors, these processes have provided flexible polyurethane foam having decreased breathability as compared with the flexible foam prepared from common polyoxyalkylene polyol. One effect for improving impact strength, compression set and transmissibility at 6 Hz has been unsatisfactory.

SUMMARY OF THE INVENTION

The object of the invention is to provide a water blown flexible high-resilience polyurethane foam which has low density (overall foam density of 55 kg/m$^3$ or less), is improved in impact resilience and compression set, exhibits excellent effect on reduction of transmissibility at 6 Hz and has enhanced mechanical strengths even under a reduced amount of an amine catalyst; a preparation process of the foam; and a vehicle cushion and other interiors which are formed by the flexible high-resilience polyurethane foam.

As a result of an intensive investigation in order to accomplish the above object, the present inventors have found that a flexible high-resilience polyurethane foam having improved impact resilience and compression set, excellent effect on the reduction of transmissibility at 6 Hz and also improved mechanical strengths even under a reduced amount of one amine catalyst can be obtained by using, as an organic polyisocyanate composition, a mixture having a specified ratio of polymethylenepolyphenyl isocyanate being regulated in a specific composition of benzene ring compounds to tolylene diisocyanate or by using an isocyanate terminated prepolymer obtained by reacting, when necessary, said mixture with polyoxyalkylene polyol having a specific structure and by reacting said organic polyisocyanate composition with polyoxyalkylene polyol having a specified value in a hydroxyl value, monool content and head-to-tail coupling selectivity. Thus, the present invention has been completed.

That is, an aspect of the present invention is a flexible high-resilience polyurethane foam obtained by reacting a mixture of an active hydrogen containing compound, blowing agent, catalyst, surfactant and other auxiliary agent with an organic polyisocyanate composition, comprising:

(A) using water as the blowing agent,
(B) using an organic polyisocyanate composition consisting of:
  (a) polymethylenepolyphenyl isocyanate represented by the formula (1):

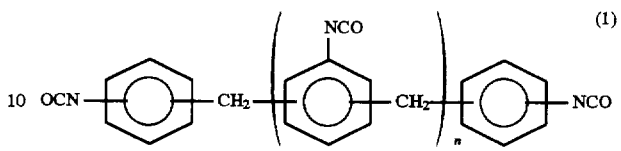

wherein n is 0 or an integer of 1 and more, a weight ratio of a three benzene ring compound (n=1) to the sum of a four or more benzene ring compound (n≧2) and the less active ingredient [three benzene ring compound]/[four or more benzene ring compound+less active ingredient] is 1.1 to 20.0, and a content of a two benzene ring compound (n=0) is from more than 60% by weight to 90% or less by weight, and (b) 2,4- and/or 2,6-tolylene diisocyanate in a ratio (a)/(b) of 97/3 to 80/20, and (C) using an active hydrogen containing compound consisting of polyoxyalkylene polyol [hereinafter referred to as polyoxyalkylene polyol (C)] having a hydroxyl value of 10 to 35 mgKOH/g, monool content of 15 mol % or less, and a head-to-tail coupling selectivity of 96 mol % or more, preferably 96 to 98 mol % in the propylene oxide addition polymerization; and a process for preparing the foam.

The present invention further includes a flexible high resilience polyurethane foam and a preparation process of the same, comprising using said organic polyisocyanate composition consisting of an isocyanate terminated prepolymer obtained by reacting a mixture of (a) said polymethylenepolyphenyl isocyanate and (b) said mixture of 2,4- and/or 2,6-tolylene diisocyanate with a single compound or a mixture of polyoxyalkylene polyol having a molar addition polymerization ratio of an alkylene oxide having 3 or more carbon atoms to ethylene oxide of 60/40 to 15/85, average functionality of 2 to 4, and average molecular weight of 2,000 to 10,000.

Other preferred aspects of the invention include the following.

That is, in the organic polyisocyanate composition (B), polymethylenepolyphenyl isocyanate (a) has, for example, [three benzene ring compound]/[four or more benzene ring compound+less active ingredient] of preferably 1.2 to 10.0, more preferably 2.0 to 4.0 and a content of the two benzene ring compound of preferably more than 60% by weight to 80% or less by weight.

Further, in the organic polyisocyanate composition (B), the mixture of polymethylenepolyphenyl isocyanate (a) and 2,4- and 2,6-tolylene diisocyanate (b) has, for example, a mixture ratio (a)/(b) by weight of 95/5 to 85/15.

Polyoxyalkylene polyol used for preparing the isocyanate terminated prepolymer (hereinafter referred to as polyoxyalkylene polyol for modification) preferably has a molar addition polymerization ratio of alkylene oxide having 3 or more carbon atoms to ethylene oxide of 50/50 to 20/80, average functionality of 2 to 4 and average molecular weight of 3,000 to 8,000.

On the other hand, the polyoxyalkylene polyol (C), i.e. the active hydrogen containing compound(C), is prepared, for example, by carrying out addition polymerization of alkylene oxide on an active hydrogen containing compound having 3 to 8 hydroxyl groups in the presence of alkali metal hydroxide, preferably cesium hydroxide in particular.

The flexible high-resilience polyurethane foam of the invention is excellent in impact resilience, compression set and transmissibility at 6 Hz and prevents problems due to use of water as a blowing agent and reduction of the catalyst amount, that is, deterioration of impact resilience and compression set, increase in transmissibility at 6 Hz and reduction of tensile strength, tear resistance and elongation.

Consequently, the flexible high-resilience polyurethane foam of the invention is extremely suited for uses which strongly require excellent impact resilience, compression set and transmissibility at 6 Hz, for example, cushioning materials of vehicle interiors including a head rest, sheet back and other sheet pads and sheet cushions.

DETAILED DESCRIPTION OF THE PREFERRED EMBODIMENT

In the present invention, tolylene diisocyanate is simply referred to as TDI, diphenylmethane diisocyanate as MDI, 4,4'-diphenylmethane diisocyanate as 4,4'-MDI, 2,4'-diphenylmethane diisocyanate as 2,4'-MDI and polymethylenepolyphenyl isocyanate as poly-MDI, respectively.

Poly-MDI consists of polymethylenepolyphenyl isocyanate represented by the formula (1):

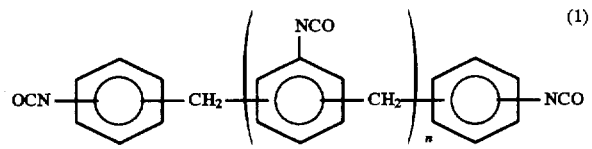

(1)

wherein n is 0 or an integer of 1 and more, and other less active ingredients, for example, isocyanate dimers such as carbodiimide, uretone imine and uretidione compounds, isocyanate trimers such as isocyanurate compounds and tarry materials having unspecified structure.

The polybenzene ring compound of poly-MDI comprises a two benzene ring compound (n=0), three benzene ring compound (n=1), and four or more benzene ring compound (n≧2), decreasing content with increasing numbers of the benzene ring, and substantially contains up to a six benzene ring compound. Consequently, the amount of a four or more benzene ring compound and a less active ingredient is referred to as the total amount except the two and three benzene ring compounds.

In the organic polyisocyanate composition (B) which can be used in the invention, (a) poly-MDI contains the two benzene ring compound in an amount of from more than 60% by weight to 90% or less by weight, preferably from more than 60% by weight to 80% or less by weight and has [three benzene ring compound]/[four or more benzene ring compound+less active ingredient] (hereinafter referred to as a weight ratio) of 1.1 to 20.0, preferably 1.2 to 10.0, more preferably 2.0 to 4.0.

Exemplary marketed poly-MDI is COSMONATE M-200 (manufactured by Mitsui Toatsu Chem. Inc.). This poly-MDI has the weight ratio of [three benzene ring compound] /[four or more benzene ring compound+less active ingredient] of 0.3 to 0.9 and is hence unsuitable for poly-MDI component which is used in the invention.

Poly-MDI which is used in the invention can be prepared by phosgenation of a polyamine mixture formed by condensation of aniline with formaldehyde in the presence of a catalyst according to the process described in, for example, Japanese Laid-Open Patent HEI 5-310676. Poly-MDI which can be used for the invention can be obtained by carrying out the above reaction under the described condensation and purification conditions described in the above patent.

The quantitative analysis of the benzene ring composition in poly-MDI can be carried out by subjecting the isocyanate group of poly-MDI to deactivating such as a method for converting to methyl carbonate, and successively to liquid chromatography using tetrahydrofuran or dimethylformamide as a solvent.

In the organic polyisocyanate composition (B), no particular limitation is imposed upon the isomer ratio of (b) 2,4-TDI and/or 2,6-TDI. The isomer ratio of 2,4-TDI/2,6-TDI includes 100/0, 80/20 and 65/35 by weight.

The organic polyisocyanate composition (B) which can be used in the invention consists of the above (a) and (b), and has a ratio (a)/(b) of 97/3 to 80/20 by weight, preferably 95/5 to 85/15 by weight. The composition (B) can be prepared with ease by mixing the components (a) and (b).

Further, the isocyanate terminated prepolymer obtained by reacting the above organic polyisocyanate composition with polyoxyalkylene polyol for modification can also be used as the organic polyisocyanate composition of the invention.

Polyoxyalkylene polyol for modification which can be used has a molar addition polymerization ratio of alkylene oxide having 3 or more carbon atoms, preferably 3 to 4 carbon atoms to ethylene oxide of 60/40 to 15/85, average functionality of 2 to 4, and average molecular weight of 2,000 to 10,000, or preferably has a molar addition polymerization ratio of alkylene oxide having 3 or more carbon atoms, preferably 3 to 4 carbon atoms to ethylene oxide of 50/50 to 20/80, average functionality of 2 to 4, and average molecular weight of 3,000 to 8,000. The polyoxyalkylene polyol for modification can be used singly or as a mixture.

Polyoxyalkylene polyol for modification can be obtained by using an initiator including an active hydrogen containing compound having a functionality of 2 to 4, for example, ethylene glycol, propylene glycol and other bifunctional active hydrogen containing compounds; glycerol, trimethylol propane and other trifunctional compounds; and pentaerythritol, diglycerol and other four functional active hydrogen containing compounds, and by carrying out polymerization of alkylene oxide having 3 or more carbon atoms and ethylene oxide at a molar addition polymerization ratio by 60/40 to 15/85 in the presence of a catalyst. The polyoxyalkylene polyol thus obtained has a random structure or a block structure or a mixture thereof. The random structure is preferred. The polyoxyalkylene polyol for modification has an average molecular weight of 2,000 to 10,000, preferably 3,000 to 8,000.

Polyoxyalkylene polyol (C) for use in the invention can also be used for polyoxyalkylene polyol for modification as long as the polyol (C) can satisfy the above specified conditions in the molar addition polymerization ratio of alkylene oxide to ethylene oxide, average functionality and average molecular weight.

The reaction of the above organic polyisocyanate composition (B) with polyoxyalkylene polyol for modification can be usually completed by stirring at about 80° C. for several hours.

Next, polyoxyalkylene polyol (C) which can be used in the invention has a hydroxyl value of 10 to 35 mgKOH/g, monool content of 15 mol % or less, and head-to-tail coupling selectivity in propylene oxide addition polymerization of 96 mol % or more, preferably 96 to 98 mol %.

Polyoxyalkylene polyol (C) is a compound or a mixture thereof having structure obtained by addition polymerization of alkylene oxide on an active hydrogen containing compound having 3 to 8 hydroxyl groups.

Active hydrogen containing compounds include, for example, glycerol, trimethylol propane, hexane triol, mono-, di-, and tri-ethanol amine, pentaerythritol, methylglucoside, diglycerol, ethylenediamine, propylene diamine, sorbitol and sucrose.

These active hydrogen containing compounds can be used as a mixture.

Exemplary alkylene oxides which can be addition polymerized on the above active hydrogen containing compounds include ethylene oxide, propylene oxide, butylene oxide and styrene oxide. Propylene oxide is used in most cases.

No particular restriction is imposed upon the polymerization type in the addition polymerization of alkylene oxide on the above active hydrogen containing compound. Either block or random polymerization can be carried out. However, preferred polyoxyalkylene polyol has 5% by weight if a blocked ethylene oxide group at the terminal of the polyol chain, that is, has a 5% by weight or more of a terminal oxyethylene group. The polyurethane foam obtained by using such polyoxyalkylene polyol is excellent in processing ability, curability and mechanical strengths.

Polyoxyalkylene polyol (C) used in the invention has a hydroxyl value of 10 to 35 mgKOH/g, preferably 20 to 30 mgKOH/g. The hydroxyl value less than 10 mgKOH/g leads to remarkable viscosity increase in polyoxyalkylene polyol (C) and polymer polyol obtained by using the polyoxyalkylene polyol (C) as a matrix and cannot be practically used for preparation of flexible high-resilience polyurethane foam. On the other hand, the hydroxyl value exceeding 35 mgKOH/g results in reduction of impact resilience and also unfavorably impairs mechanical strengths and processing ability of the foam.

Polyoxyalkylene polyol (C) used in the invention has a monool content of 15 mol % or less. The content exceeding 15 mol % leads to reduction of impact resilience and increase in compression set.

Further, polyoxyalkylene polyol (C) used in the invention is 96 mol % or more, preferably 96 to 98 mol % in the head-to-tail coupling selectivity in addition polymerization of propylene oxide. The selectivity less than 96 mol % gives harmful effect on all physical properties such as impact resilience, compression set and transmissibility at 6 Hz, and at the same time reduces breathability of the resulting foam and causes shrinkage of the foam in serious cases.

Such polyoxyalkylene polyol (C) used in the invention can be prepared by carrying out addition polymerization of alkylene oxide, for example, propylene oxide and other alkylene oxide, when necessary, on the above active hydrogen containing compound in the presence of a catalyst. Alkali metal hydroxide is used as the catalyst for addition polymerization. Exemplary alkali metal hydroxides include potassium hydroxide, sodium hydroxide and cesium hydroxide. Cesium hydroxide is preferably used. The cesium catalyst has commonly purity of 90% by weight or more. The amount of the catalyst is 0.05 to 0.5 mol for 1 mol of polyoxyalkylene polyol.

The addition polymerization reaction is carried out at 60° to 98° C. under elevated pressure of 4 kg/cm² or less. The catalyst used is removed after finishing the reaction by neutralization with hydrochloric acid or phosphoric acid, adsorption with an adsorbent, washing with water or ion exchange with an ion exchange resin.

Polyoxyalkylene polyol (C) used in the invention can be replaced at least portionally by polymer polyol (Trade Mark) which is polyoxyalkylene polyol modified by addition polymerization of an ethylenically unsaturated monomer.

No particular restriction is put on the ethylenically unsaturated monomer. Exemplary monomers include acrylonitrile, styrene, methyl methacrylate and vinylidene chloride. Polymers obtained from these monomers are dispersed in the form of particulates having a typical size of 0.1 to 10μ.

Combined use of the above polymer polyol with polyoxyalkylene polyol can provide permeability improvement and hardness increases for the foam without decreasing impact resilience, compression set and transmissibility at 6 Hz of the foam.

Polyoxyalkylene polyol (C) is used after preparing a resin premix by previously mixing with other ingredients in order to obtain the flexible high-resilience polyurethane foam by reacting with the above organic polyisocyanate composition (B).

Exemplary other ingredients to be contained in the resin premix include a blowing agent, catalyst, surfactant and crosslinking agent.

The blowing agent (A) is water. Water can be used singly or in combination with carbon dioxide, nitrogen or hydrocarbon.

However, use of a chlorofluorocarbon blowing agent is unfavorable in view of global environmental protection against destruction of an ozone layer.

Use of the organic polyisocyanate composition obtained by mixing poly-MDI having a specific benzene ring composition of the invention with TDI in a specified ratio and polyoxyalkylene polyol (C) having a hydroxyl value, monool content and head-to-tail coupling selectivity which satisfy specific conditions can quite surprisingly prepare a flexible polyurethane foam having an overall density of 55 kg/m³ or less, high mechanical strengths, high impact resilience, low compression set and low transmissibility at 6 Hz by use of a reduced amount of an amine catalyst in the quite absence of the chlorofluorocarbon blowing agent.

The catalyst which can be used is triethylenediamine, dimethylethanolamine, bis(dimethylaminoethyl) ether and other known catalysts.

The surfactant which can be used is a silicone type surfactant, for example, SRX-274C (Trade Mark of Toray. Dow Corning Co.) and L-5309 (Trade Mark of Nippon Unicar Co.)

The crosslinking agent which can be used is triethanolamine, diethanolamine and other alkanolamine crosslinking agent.

A flame retardant, viscosity reducer, antioxidant, colorant, and other known auxiliary agents can also be used.

In preparing the foam of the invention, the above organic polyisocyanate composition (B) is mixed with a resin premix containing polyoxyalkylene polyol (C), blowing agent (A) and other auxiliary agents so as to obtain a prescribed NCO-index, and poured into a mold by common procedures to obtain a foam having a desired shape.

According to the present invention, the flexible high-resilience polyurethane foam which has been molded into a vehicle sheet and other articles has high mechanical strengths, high impact resilience, low compression set and low transmissibility at 6 Hz.

The invention will be illustrated by way of examples hereinafter. Part and % in the examples and comparative examples mean part by weight and % by weight, respectively.

1. Synthetic Examples of Polyoxyalkylene Polyol (C)

(1) Synthesis of polyoxyalkylene polyol A

To 1 mol of glycerol, 0.23 mol of cesium hydroxide was added and dehydrated at 100° C. for 6 hours under reduced pressure. Successively, addition polymerization of propylene oxide was carried out at 80° C., under maximum reaction pressure of 3.5 kg/cm² and then addition polymerization of ethylene oxide was carried out at 97° C. Polyoxyalkylene polyol thus obtained had a hydroxyl value of 24 mgKOH/g and a terminal oxyethylene group content of 15 wt %.

Liquid chromatography was carried out on the polyoxyalkylene polyol with a liquid chromatograph instrument manufactured by Nippon Bunko Co. Monool content was measured from the area ratio of triol and monool in the chromatogram. The monool content was 8.0 mol %. Selectivity of head to tail coupling was 96.3 mol %.

Selectivity of head-to-tail coupling was measured with a 400 MHz $C^{13}$ NMR instrument manufactured by Nippon Densi Co. by using deuterated chloroform as a solvent. The selectivity was measured on the obtained $C^{13}$-NMR spectrum of polyoxyalkylene polyol from the ratio of a signal (16.9 to 17.4 ppm) of the methyl group on an oxypropylene segment having head-to-tail coupling to a signal (17.7 to 18.5 ppm) of the methyl group on an oxypropylene segment having head-to-head coupling. Assignment of each signal was referred to the value described in the report; F. C. Schiling and A. E. Tonelli, Macromolecules 19, 1337–1343 (1986).

(2) Synthesis of polyoxyalkylene polyols B to D

Polyoxyalkylene polyols B to D were obtained by carrying put the same procedures as described in Synthetic Example (1). Table 1 illustrates structure and analytical data of polyoxyalkylene polyols A to D. In the table, numbers of hydroxy group, 3 means a glycerol initiated polyalkylene polyol and 4 means a pentaerythritol initiated polyalkylene polyol.

TABLE 1

| Polyoxyalkylene polyol (C) | A | B | C | D |
|---|---|---|---|---|
| Numbers of hydroxy group | 3 | 3 | 3 | 4 |
| Hydroxyl value (mgKOH/g) | 24 | 28 | 21 | 24 |
| Terminal oxyethylene content (wt %) | 15 | 15 | 15 | 15 |
| Monool content (mol %) | 8.0 | 7.2 | 10.5 | 14.0 |
| Head-to-tail coupling selectivity (mol %) | 96.3 | 96.4 | 97.0 | 96.4 |

(3) Synthesis of polyoxyalkylene polyol E

To 1 mol of glycerol, 6.93 g of a so-called composite metal cyanidation complex catalyst composed of zinc.cobalt cyanide, zinc chloride, water and dimethoxyethanol was added and addition polymerization of propylene oxide was carried out at reaction temperature of 90° C. under increased pressure of 4.0 kg/cm². Polyoxyalkylene polyol obtained had a hydroxyl value of 33 mgKOH/g. The above composite metal cyanidation complex catalyst was extracted with an aqueous ammonia solution, polyoxyalkylene polyol was purified by washing with water, successively 0.23 mol of potassium hydroxide was added for 1 mol of glycerol, and dehydration was carried out at 100° C. for 6 hours under reduced pressure. Thereafter addition polymerization of ethylene oxide was carried out at 100° C. Polyoxyalkylene polyol obtained had a hydroxyl value of 28 mgKOH/g and terminal oxyethylene group content of 15 wt %.

Monool content and head-to-tail coupling selectivity of polyoxyalkylene polyol was measured by carrying out the same procedures as described in the above synthetic Example (1). The polyol had a monool content of 9.6 mol % and a head-to tail coupling selectivity of 85.4 mol %.

Table 2 illustrates structure and analytical data of polyoxyalkylene polyol E.

(4) Synthesis of polyoxyalkylene polyol F

To 1 mol of glycerol, 0.37 mol of potassium hydroxide was added and dehydrated at 100° C. for 6 hours under reduced pressure, addition polymerization of propylene oxide was successively carried out at reaction temperature of 115° C., under increased pressure of 5.0 kg/cm² and then addition polymerization of ethylene oxide was carried out at 115° C. to obtain polyoxyalkylene polyol having a hydroxyl value of 28 mgKOH/g. Terminal oxyethylene group content was 15 wt %.

Monool content and head-to-tail coupling selectivity were measured by carrying out the same procedures as described in Synthetic Example (1) of the polyoxyalkylene polyol. The monool content was 29.3 mol % and the head-to-tail coupling selectivity was 96.3 mol %.

Table 2 illustrates structure and analytical data of polyoxyalkylene polyol F.

TABLE 2

| Polyoxyalkylene polyol (C) | E | F |
|---|---|---|
| Synthetic catalyst | Composite metal cyanidation complex | Potassium hydroxide |
| Numbers of hydroxyl group | 3 | 3 |
| Hydroxyl value (mgKOH/g) | 28 | 28 |
| Terminal oxyethylene group content (wt %) | 15 | 15 |
| Monool content (mol %) | 9.6 | 29.3 |
| Head-to-tail coupling selectivity (mol %) | 85.4 | 96.3 |

2. Synthetic Examples of Polymer Polyol (1) Polymer polyol a

Polymer polyol having a hydroxyl value of 19.5 mgKOH/g which was obtained by graft polymerization of 20 parts of acrylonitrile on 100 parts of polyoxyalkylene polyol A (cesium hydroxide catalyst was used).

(2) Polymer polyol e

Polymer polyol having a hydroxyl value of 22.8 mgKOH/g which was obtained by graft polymerization of 20 parts of acrylonitrile on 100 parts of polyoxyalkylene polyol E (composite metal cyanidation complex catalyst was used).

(3) Polymer polyol f

Polymer polyol having a hydroxyl value of 22.8 mgKOH/g which was obtained by graft polymerization of 20 parts of acrylonitrile on 100 parts of polyoxyalkylene polyol F (cesium hydroxide catalyst was used).

3. Preparation of Organic Polyisocyanate Composition

The following organic polyisocyanate compositions (a) to (q) were prepared and used for examples and comparative examples.

1) To 85.0 parts of polymethylenepolyphenyl isocyanate containing 67.5 wt % of the two benzene ring compound, 24.0 wt % of the three benzene ring compound, and 8.5 wt % of the four or more benzene ring compound and less active ingredients, 15.0 parts of tolylene diisocyanate having a 2,4-/2,6-isomer ratio of 80/20 was added and stirred for an hour. Successively 14.5 parts of polyoxyalkylene polyol which had an average molecular weight of 3,000, an average functionality of 2 and a propylene oxide/ethylene oxide molar addition polymerization ratio of 20/80 and was used for preparation of a random addition prepolymer was added and reacted at 80° C. for 2 hours with stirring. An organic polyisocyanate composition (a) for use in a foaming test was obtained and had an NCO-content of 29.7%.

2) To 90.0 parts of polymethylenepolyphenyl isocyanate containing 72.9 wt % of the two benzene ring compound, 25.7 wt % of the three benzene ring compound, and 1.4 wt % of the four or more benzene ring compound and less active ingredients, 10.0 parts of tolylene diisocyanate having a 2,4-/2,6-isomer ratio of 80/20 was added and stirred for an hour. Successively 18.5 parts of polyoxyalkylene polyol which had an average molecular weight of 7,500, an average functionality of 3 and a propylene oxide/ethylene oxide molar addition polymerization ratio of 50/50 and was used for preparation of a random addition prepolymer was added and reacted at 80° C. for 2 hours with stirring. An organic polyisocyanate composition (b) for use in a foaming test was obtained and had an NCO-content of 29.0%.

3) To 95.0 parts of polymethylenepolyphenyl isocyanate containing 85.0 wt % of the two benzene ring compound, 11.3 wt % of the three benzene ring compound, and 3.7 wt % of the four or more benzene ring compound and less active ingredients, 5.0 parts of tolylene diisocyanate having a 2,4-/2,6-isomer ratio of 80/20 was added and stirred for an hour. Successively 20.0 parts of polyoxyalkylene polyol which had an average molecular weight of 10,000, average functionality of 4, and a propylene oxide/ethylene oxide molar addition polymerization ratio of 57/43 and was used for preparation of a random addition prepolymer was added and reacted at 80° C. for 2 hours with stirring. An organic polyisocyanate composition (c) for use in a foaming test was obtained and had an NCO-content of 27.0%.

4) To 83.0 parts of polymethylenepolyphenyl isocyanate containing 71.1 wt % of the two benzene ring compound, 16.3 wt % of the three benzene ring compound, and 12.6 wt % of the four or more benzene ring compound and less active ingredients, 17.0 parts of tolylene diisocyanate having a 2,4-/2,6-isomer ratio of 80/20 was added and stirred for an hour. Successively 21.0 parts of polyoxyalkylene polyol which had an average molecular weight of 7,000, average functionality of 2, and a propylene oxide/ethylene oxide molar addition polymerization ratio of 15/85 and was used for preparation of a random addition prepolymer was added and reacted at 80° C. for 2 hours with stirring. An organic polyisocyanate composition (d) for use in a foaming test was obtained and had an NCO-content of 29.2%.

5) To 85.0 parts of polymethylenepolyphenyl isocyanate containing 72.3 wt % of the two benzene ring compound, 20.2 wt % of the three benzene ring compound, and 7.5 wt % of the four or more benzene ring compound and less active ingredients, 15.0 parts of tolylene diisocyanate having a 2,4-/2,6-isomer ratio of 80/20 was added and stirred for an hour. An organic polyisocyanate composition (e) for use in a foaming test was obtained and had an NCO-content of 34.8%.

6) To 93.0 parts of polymethylenepolyphenyl isocyanate containing 80.1 wt % of the two benzene ring compound, 17.4 wt % of the three benzene ring compound, and 2.5 wt % of the four or more benzene ring compound and less active ingredients, 7.0 parts of tolylene diisocyanate having a 2,4-/2,6-isomer ratio of 80/20 was added and stirred for an hour. An organic polyisocyanate composition (f) for use in a foaming test was obtained and had an NCO-content of 34.4%.

7) To 90.0 parts of polymethylenepolyphenyl isocyanate containing 72.9 wt % of the two benzene ring compound, 25.7 wt % of the three benzene ring compound, and 1.4 wt % of the four or more benzene ring compound and less active ingredients, 10.0 parts of tolylene diisocyanate having a 2,4-/2,6-isomer ratio of 80/20 was added and stirred for an hour. Successively 18.5 parts of polyoxyalkylene polyol which had an average molecular weight of 5,000, average functionality of 3, and a propylene oxide/ethylene oxide molar addition polymerization ratio of 40/60 and was used for preparation of a random addition prepolymer was added and reacted at 80° C. for 2 hours with stirring. An organic polyisocyanate composition (g) for use in a foaming test was obtained and had an NCO-content of 28.9%.

8) To 88.0 parts of polymethylenepolyphenyl isocyanate containing 70.0 wt % of the two benzene ring compound, 27.9 wt % of the three benzene ring compound, and 2.1 wt % of the four or more benzene ring compound and less active ingredients, 12.0 parts of tolylene diisocyanate having a 2,4-/2,6-isomer ratio of 80/20 was added and stirred for an hour. An organic polyisocyanate composition (h) for use in a foaming test was obtained and had an NCO-content of 34.8%.

9) To 85.0 parts of polymethylenepolyphenyl isocyanate containing 67.5 wt % of the two benzene ring compound, 24.0 wt % of the three benzene ring compound, and 8.5 wt % of the four or more benzene ring compound and less active ingredients, 15.0 parts of tolylene diisocyanate having a 2,4-/2,6-isomer ratio of 80/20 was added and stirred for an hour. Successively 14.5 parts of polyoxyalkylene polyol which had an average molecular weight of 5,000, average functionality of 3, and a propylene oxide/ethylene oxide molar addition polymerization ratio of 65/35 and was used for preparation of a random addition prepolymer was added and reacted at 80° C. for 2 hours with stirring. An organic polyisocyanate composition (i) for use in a foaming test was obtained and had an NCO-content of 30.1%.

10) To 90.0 parts of polymethylenepolyphenyl isocyanate containing 72.9 wt % of the two benzene ring compound, 25.7 wt % of the three benzene ring compound, and 1.4 wt % of the four or more benzene ring compound and less active ingredients, 10.0 parts of tolylene diisocyanate having a 2,4-/2,6-isomer ratio of 80/20 was added and stirred for an hour. Successively 18.5 parts of polyoxyalkylene polyol which had an average molecular weight of 1,400, average functionality of 2, and a propylene oxide/ethylene oxide molar addition polymerization ratio of 20/80 and was used for preparation of a random addition prepolymer was added and reacted at 80° C. for 2 hours with stirring. An organic polyisocyanate composition (j) for use in a foaming test was obtained and had an NCO-content of 28.0%.

11) To 83.0 parts of polymethylenepolyphenyl isocyanate containing 71.1 wt % of the two benzene ring compound, 16.3 wt % of the three benzene ring compound, and 12.6 wt % of the four or more benzene ring compound and less active ingredients, 17.0 parts of tolylene diisocyanate having a 2,4-/2,6-isomer ratio of 80/20 was added and stirred for an hour. Successively 21.0 parts of polyoxyalkylene polyol which had an average molecular weight of 4,000, average functionality of 2, and a propylene oxide/ethylene oxide molar addition polymerization ratio of 10/90 and was used for preparation of a random addition prepolymer was added and reacted at 80° C. for 2 hours with stirring. An organic polyisocyanate composition (k) for use in a foaming test was obtained and had an NCO-content of 29.1%.

12) To 83.0 parts of polymethylenepolyphenyl isocyanate containing 94.4 wt % of the two benzene ring compound, 5.2 wt % of the three benzene ring compound, and 0.4 wt % of the four or more benzene ring compound and less active ingredients, 17.0 parts of tolylene diisocyanate having a 2,4-/2,6-isomer ratio of 80/20 was added and stirred for an hour. An organic polyisocyanate composition (1) for use in a foaming test was obtained and had an NCO-content of 35.9%.

13) To 93.0 parts of polymethylenepolyphenyl isocyanate containing 58.5 wt % of the two benzene ring compound, 36.9 wt % of the three benzene ring compound, and 4.6 wt % of the four or more benzene ring compound and less active ingredients, 7.0 parts of tolylene diisocyanate having a 2,4-/2,6-isomer ratio of 80/20 was added and stirred for an hour. An organic polyisocyanate composition (m) for use in a foaming test was obtained and had an NCO-content of 34.0%.

14) To 100.0 parts of polymethylenepolyphenyl isocyanate containing 71.1 wt % of the two benzene ring compound, 21.9 wt % of the three benzene ring compound, and 7.0 wt % of the four or more benzene ring compound and less active ingredients, 13.5 parts of polyoxyalkylene polyol having an average molecular weight of 5,000, average functionality of 3, and a propylene oxide/ethylene oxide molar addition polymerization ratio of 100/0 and being used for preparation of a prepolymer was added and reacted at 80° C. for 2 hours with stirring. An organic polyisocyanate composition (n) for use in a foaming test was obtained and had an NCO-content of 29.0%.

15) To 75.0 parts of polymethylenepolyphenyl isocyanate containing 70.0 wt % of the two benzene ring compound, 17.5 wt % of the three benzene ring compound, and 12.5 wt % of the four or more benzene ring compound and less active ingredients, 25.0 parts of tolylene diisocyanate having a 2,4-/2,6-isomer ratio of 80/20 was added and stirred for an hour. An organic polyisocyanate composition (o) for use in a foaming test was obtained and had an NCO-content of 36.5%.

16) To 90.0 parts of polymethylenepolyphenyl isocyanate containing 78.9 wt % of the two benzene ring compound, 20.3 wt % of the three benzene ring compound, and 0.8 wt % of the four or more benzene ring compound and less active ingredients, 10.0 parts of tolylene diisocyanate having a 2,4-/2,6-isomer ratio of 80/20 was added and stirred for an hour. An organic polyisocyanate composition (p) for use in a foaming test was obtained and had an NCO-content of 34.7%.

17) To 90.0 parts of polymethylenepolyphenyl isocyanate containing 69.8 wt % of the two benzene ring compound, 12.5 wt % of the three benzene ring compound, and 17.7 wt % of the four or more benzene ring compound and less active ingredients, 10.0 parts of tolylene diisocyanate having a 2,4-/2,6-isomer ratio of 80/20 was added and stirred for an hour. Successively 19.0 parts of polyoxyalkylene polyol which had an average molecular weight of 5,000, average functionality of 3, and a propylene oxide/ethylene oxide molar addition polymerization ratio of 100/0 and was used for preparation of a random addition prepolymer was added and reacted at 80° C. for 2 hours with stirring. An organic polyisocyanate composition (g) for use in a foaming test was obtained and had an NCO-content of 28.8%.

Table 3 and Table 4 illustrate raw material compositions and amounts of charge in the organic polyisocyanate compositions used in the examples and comparative examples.

TABLE 3

| Organic polyisocyanate composition (B) | a | b | c | d | e | f | g | h |
|---|---|---|---|---|---|---|---|---|
| Poly-MDI (part by weight) | 85.0 | 90.0 | 95.0 | 83.0 | 85.0 | 93.0 | 90.0 | 88.0 |
| Benzene ring compound composition (wt %) | | | | | | | | |
| 2 benzene ring compound | 67.5 | 72.9 | 85.0 | 71.1 | 72.3 | 80.1 | 72.9 | 70.0 |
| 3 benzene ring compound | 24.0 | 25.7 | 11.3 | 16.3 | 20.2 | 17.4 | 25.7 | 27.9 |
| 4 or more benzene ring compound | 8.5 | 1.4 | 3.7 | 12.6 | 7.5 | 2.5 | 1.4 | 2.1 |
| [3 benzene ring compound]/[4 or more benzene ring compound] (weight ratio) | 2.8 | 19.0 | 3.1 | 1.3 | 2.7 | 7.0 | 18.4 | 13.3 |
| TDI*[1] (part by weight) | 15.0 | 10.0 | 5.0 | 17.0 | 15.0 | 7.0 | 10.0 | 12.0 |
| Polyoxyalkylene polyol for modification (part by weight) | 14.5 | 18.5 | 20.0 | 21.0 | — | — | 18.5 | — |
| Molar addition polymerization ratio (PO/EO)*[2] | 20/80 | 50/50 | 57/43 | 15/85 | — | — | 40/60 | — |
| Average functionality | 2 | 3 | 4 | 2 | — | — | 3 | — |
| Average molecular weight | 3000 | 7500 | 10000 | 7000 | — | — | 5000 | — |
| NCO (%)*[3] | 29.7 | 29.0 | 27.0 | 29.2 | 34.8 | 34.4 | 28.9 | 34.8 |

*[1]: 2,4-/2,6-isomer ratio = 80/20
*[2]: PO/EO Propyrenoxide/ethylene oxide
*[3]: NCO content (5) in organic polyisocyanate composition (B)

TABLE 4

| Organic polyisocyanate composition (B) | i | j | k | l | m | n | o | p | q |
|---|---|---|---|---|---|---|---|---|---|
| Poly-MDI (part by weight) | 85.0 | 90.0 | 83.0 | 83.0 | 93.0 | 100.0 | 75.0 | 90.0 | 90.0 |
| Benzene ring compound composition (wt %) | | | | | | | | | |
| 2 benzene ring compound | 67.5 | 72.9 | 71.1 | 94.4 | 58.5 | 71.1 | 70.0 | 78.9 | 69.1 |
| 3 benzene ring compound | 24.0 | 25.7 | 16.3 | 5.2 | 36.9 | 21.9 | 17.5 | 20.3 | 12.5 |
| 4 or more benzene ring compound | 8.5 | 1.4 | 12.6 | 0.4 | 4.6 | 7.0 | 12.5 | 0.8 | 17.7 |
| [3 benzene ring compound]/[4 or more | 2.8 | 18.4 | 1.3 | 17.3 | 8.0 | 3.0 | 1.4 | 25.4 | 0.7 |

TABLE 4-continued

| Organic polyisocyanate composition (B) | i | j | k | l | m | n | o | p | q |
|---|---|---|---|---|---|---|---|---|---|
| benzene ring compound] (weight ratio) | | | | | | | | | |
| TDI*¹ (part by weight) | 15.0 | 10.0 | 17.0 | 17.0 | 7.0 | 0 | 25.0 | 10.0 | 10.0 |
| Polyoxyalkylene polyol for modification (part by weight) | 14.5 | 18.5 | 21.0 | — | — | 13.5 | — | — | 19.1 |
| Molar addition polymerization ratio (PO/EO)*² | 65/35 | 20/80 | 10/90 | — | — | 100/0 | — | — | 100/0 |
| Average functionality | 3 | 2 | 2 | — | — | 3 | — | — | 3 |
| Average molecular weight | 5000 | 1400 | 4000 | — | — | 5000 | — | — | 5000 |
| NCO (%)*³ | 30.1 | 28.0 | 29.1 | 35.9 | 34.0 | 29.0 | 36.5 | 34.7 | 28.8 |

*¹: 2,4-/2,6-isomer ratio = 80/20
*²: PO/EO Propyrenoxide/ethylene oxide
*³: NCO content (5) in organic polyisocyanate composition (B)

4. Preparation of Resin Premix

Polyoxyalkylene polyol(C) and polymer polyol which were prepared in the above 1 and 2 were used.

To a mixture of polyoxyalkylene polyol (referred to as an active hydrogen compound in the tables) and polymer polyol as illustrated in Table 5 and Table 6, additives were added and mixed as described below to form a premix and used for examples and comparative examples.

| | (unit : wt part) |
|---|---|
| Polyoxyalkylene polyol A to F | 80 |
| Polymer polyol a to f | 20 |
| SRX-274C (Silicone surfactant) (manufactured by Toray . Dow Corning Co.) | 1.0 |
| Minico L-1020 (Amine catalyst) (manufactured by Katsuzai Chem. Co.) | 0.3 |
| Minico TMDA (Amine catalyst) (manufactured by Katsuzai Chem. Co.) | 0.1 |
| Water (Blowing agent) | 3.6 |

EXAMPLES 1~14

The organic polyisocyanate compositions a to h which were prepared in the above 3 and the resin premixes prepared in the above 4 were mixed so as to obtain an NCO-index of 100 as illustrated in Table 5 and used for preparing a molded sample for evaluation of foam properties.

The properties were measured after allowing to stand for 24 hours from demolding.

Molding was carried out under following conditions.

Mold: Aluminum test mold with dimensions 400×400×100 mm
Mold temperature: 55°±2° C.
Demolding time: 4 minutes (from pouring the reaction mixture into the mold to demolding the foam)
Foam properties were measured in accordance with the following method.
Overall density (kg/m³): JIS K-6401
25% ILD (kg/314 cm²): JIS K-6401
Tensile strength (kg/cm²): JIS K-6401
Tear resistance: JIS K-6401
Elongation (%): JIS K-6401
Impact resilience (%): JIS K-6401
50% Compression set (%) (dry, heat): JIS K-6301
Transmissibility at 6 Hz (%): Measured under 50 kg load, 5 mm amplitude with a vibration tester manufactured by Ito Seiki Co.
Results are illustrated in Table 5

As seen in Table 5, the foam of the invention has good impact resilience, good compression set, low transmissibility at 6 Hz, high tensile strength, high tear resistance and large elongation even in a overall density of 55 kg/m³ or less.

TABLE 5

| | | | Example | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| Resin premix | Polyoxyalkylene polyol (C) | A | B | C | D | A | B | C | D | A | A | A | B | B | B |
| | Polymer polyol | a | a | a | a | a | a | a | a | a | a | a | a | a | a |
| Organic polyisocyanate composition (B) | | a | a | a | a | e | e | e | e | b | c | d | f | g | h |
| NCO-index (NCO/OH × 100) | | 100 | 100 | 100 | 100 | 100 | 100 | 100 | 100 | 100 | 100 | 100 | 100 | 100 | 100 |
| Foam property | | | | | | | | | | | | | | | |
| Overall density (kg/m³) | | 53.1 | 52.5 | 54.0 | 53.3 | 53.0 | 52.5 | 54.2 | 53.4 | 53.3 | 54.5 | 52.3 | 54.3 | 53.8 | 53.0 |
| 25% ILD (kg/314 cm²) | | 22.3 | 22.6 | 21.0 | 22.6 | 22.0 | 22.5 | 20.7 | 22.2 | 21.9 | 22.5 | 21.0 | 23.0 | 22.1 | 23.2 |
| Tensile strength (kg/cm²) | | 1.40 | 1.45 | 1.48 | 1.49 | 1.34 | 1.30 | 1.40 | 1.40 | 1.40 | 1.50 | 1.39 | 1.38 | 1.45 | 1.35 |
| Tear resistance (kg/cm) | | 0.70 | 0.68 | 0.75 | 0.68 | 0.66 | 0.62 | 0.70 | 0.60 | 0.68 | 0.70 | 0.72 | 0.60 | 0.72 | 0.64 |
| Elongation (%) | | 120 | 117 | 125 | 115 | 115 | 116 | 115 | 112 | 122 | 130 | 128 | 115 | 123 | 112 |
| Impact resilience (%) | | 76 | 75 | 76 | 76 | 73 | 73 | 73 | 73 | 76 | 77 | 76 | 73 | 76 | 74 |
| 50% Compression set (%) (dry heat) | | 1.3 | 1.5 | 1.1 | 1.2 | 1.5 | 1.7 | 1.5 | 1.5 | 1.4 | 1.0 | 1.4 | 1.7 | 1.2 | 1.5 |
| Transmissibility at 6 Hz | | 0.5 | 0.55 | 0.50 | 0.53 | 0.57 | 0.58 | 0.54 | 0.57 | 0.51 | 0.48 | 0.50 | 0.58 | 0.53 | 0.57 |

COMPARATIVE EXAMPLES 1~13

The organic polyisocyanate composition a obtained in the above 3 was reacted with a resin premix comprised of polyoxyalkylene polyol E and polymer polyol e. The organic polyisocyanate composition a was reacted with a resin premix comprised of polyoxyalkylene polyol F and polymer polyol f. The organic polyisocyanate compositions i to q were reacted with resin premixes prepared in the above 4.

In any cases, the polyisocyanate compositions and resin premixes were used so as to obtain an NCO-index of 100 as illustrated in Table 6. The same procedures as described in Examples 1~14 were carried out to prepare molded foam samples for evaluating properties. The properties were measured and results are shown in Table 6.

EXAMPLES 15~17 AND COMPARATIVE EXAMPLES 14~17

A resin premix was prepared by using an increased amount of the catalyst in the resin premix preparation of the above 4. The resin premix thus prepared was mixed with an organic polyisocyanate composition (B) and poured into a mold to obtain a molded foam sample for use in the evaluation of foam properties. Table 7 illustrates used polyoxyalkylene polyol (C), polymer polyol and organic poly-

TABLE 6

|  |  | Comparative Example |  |  |  |  |  |  |  |  |  |  |  |  |
|---|---|---|---|---|---|---|---|---|---|---|---|---|---|---|
|  |  | 1 | 2 | 3 | 4 | 5 | 6 | 7 | 8 | 9 | 10 | 11 | 12 | 13 |
| Resin premix | Polyoxyalkylene polyol (C) | E | F | E | F | A | A | A | A | A | A | A | A | A |
|  | Polymer polyol | e | f | e | f | a | a | a | a | a | a | a | a | a |
| Organic polyisocyanate composition (B) |  | a | a | e | e | i | j | k | l | m | n | o | p | q |
| NCO-index (NCO/OH × 100) |  | 100 | 100 | 100 | 100 | 100 | 100 | 100 | 100 | 100 | 100 | 100 | 100 | 100 |
| Foam property |  |  |  |  |  |  |  |  |  |  |  |  |  |  |
| Overall density (kg/m$^3$) |  | 52.5 | 52.1 | 52.8 | 52.5 | 52.0 | 52.5 | 51.8 | 52.0 | 52.5 | 54.7 | 51.7 | 53.7 | 53.0 |
| 25% ILD (kg/314 cm$^2$) |  | 18.8 | 19.2 | 19.0 | 19.8 | 21.7 | 22.0 | 21.7 | 22.1 | 22.7 | 23.1 | 21.0 | 23.1 | 21.5 |
| Tensile strength (kg/cm$^2$) |  | 1.08 | 1.10 | 0.98 | 1.04 | 1.10 | 1.16 | 1.15 | 1.10 | 1.15 | 1.12 | 1.15 | 1.20 | 1.18 |
| Tear resistance (kg/cm) |  | 0.45 | 0.47 | 0.42 | 0.44 | 0.50 | 0.49 | 0.50 | 0.48 | 0.51 | 0.49 | 0.47 | 0.49 | 0.48 |
| Elongation (%) |  | 85 | 90 | 88 | 89 | 103 | 102 | 104 | 101 | 103 | 101 | 100 | 95 | 98 |
| Impact resilience (%) |  | 55 | 65 | 54 | 63 | 70 | 70 | 69 | 70 | 70 | 66 | 69 | 68 | 65 |
| 50% Compression set (%) (dry set) |  | 7.0 | 4.5 | 7.4 | 5.1 | 3.5 | 3.4 | 3.2 | 3.5 | 3.9 | 4.4 | 4.3 | 4.5 | 4.9 |
| Transmissibility at 6 Hz |  | 1.20 | 0.80 | 1.25 | 0.84 | 0.70 | 0.68 | 0.65 | 0.65 | 0.66 | 0.67 | 0.68 | 0.70 | 0.73 |

The foams in Comparative Examples 1~13 do not satisfy the specification of the invention in the composition of organic polyisocyanate used or the structure of polyoxyalkylene polyol (C). That is, as seen in Table 2, polyoxyalkylene polyol (C) which was used in Comparative Examples 1 and 3 has too low selectivity of head-to-tail coupling in propylene oxide addition polymerization. In Comparative Examples 2 and 4, monool content is too high in polyoxyalkylene polyol (C) used.

The organic polyisocyanate composition (B) in Comparative Example 5 is too low in the molar addition polymerization ratio of polyoxyalkylene polyol in ethylene oxide for modification. On the other hand, the ratio is too high in Comparative Example 7. The organic polyisocyanate composition in Comparative Example 6 has too low molecular weight of polyoxyalkylene polyol for modification. Comparative Example 8 has too high content of two benzene ring compound in the organic polyisocyanate composition. On the other hand, Comparative Example 9 has too low content thereof. In Comparative Example 10, the whole organic polyisocyanate is polymethylenepolyphenyl isocyanate and contains no tolylene diisocyanate. On the other hand, the organic polyisocyanate composition has two high weight ratio of tolylene diisocyanate in Comparative Example 11. The organic polyisocyanate composition in Comparative Example 12 has too high weight ratio of [three benzene ring compound]/[four or more benzene ring compound+less active ingredients]. On the other hand, Comparative Example 13 is too low in the weight ratio.

As mentioned above, in the case of using the organic polyisocyanate composition which is outside the scope of the invention, the organic polyisocyanate composition modified with unsuitable polyoxyalkylene polyol, or polyoxyalkylene polyol (C) as an active hydrogen compound, the curing property of the foam decreases at the demolding time, and additionally, the foam also lowers tensile strength, tear strength, elongation and other mechanical strengths, impact resilience, compression set and transmissibility at 6 Hz.

isocyanate composition (B). The following formulation was used in the resin premix.

|  | (unit : wt part) |
|---|---|
| Polyoxyalkylene polyol (C) | 80 |
| Polymer polyol | 20 |
| SRX-274C (Silicone surfactant) (manufactured by Toray-Dow Corning Co.) | 1.0 |
| Minico L-1020 (Amine catalyst) (manufactured by Katsuzai Chem. Co.) | 0.5 |
| Minico TMDA (Amine catalyst) (manufactured by Katsuzai Chem. Co.) | 0.15 |
| Water (Blowing agent) | 3.6 |

Preparation of molded foam sample for evaluation of properties and the method of measuring the properties were the same as carried out in the examples and comparative examples. Results are illustrated in Table 7.

As illustrated in Table 7, Examples 15, 16 and 17 used equivalent polyoxyalkylene polyol (C) and organic polyisocyanate composition (B) to those of Examples 1, 5 and 6, respectively. On the other hand, comparative examples 14, 15, 16 and 17 used equivalent polyoxyalkylene polyol (C) and organic polyisocyanate composition (B) to those of Comparative Examples 1, 2, 5 and 9, respectively.

As seen in Table 7, in spite of the difference in the catalyst amount, the foam of the invention is excellent in mechanical strength impact resilience, compression set and transmissibility at 6 Hz. In other words, excellent properties can be obtained even in a less amount of the catalyst and the fogging phenomenon can be improved.

On the other hand, foams of the comparative examples exhibit a little improvement of some properties by increase in the catalyst amount. However, the foams of the invention have much superior properties.

TABLE 7

|  |  | Example | | | Comparative Example | | | |
| --- | --- | --- | --- | --- | --- | --- | --- | --- |
|  |  | 15 | 16 | 17 | 14 | 15 | 16 | 17 |
| Resin | Polyoxyalkylene polyol (C) | A | A | B | E | F | A | A |
| premix | Polymer polyol | a | a | a | e | f | a | a |
| Organic polyisocyanate composition (B) | | a | e | e | a | a | i | m |
| NCO-index (NCO/OH × 100) | | 100 | 100 | 100 | 100 | 100 | 100 | 100 |
| Combination of resin premix/organic poly- isocyanate composition (B) | | the same as Exam. 1 | the same as Exam. 5 | the same as Exam. 9 | the same as Com. Exam. 1 | the same as Com. Exam. 2 | the same as Com. Exam. 5 | the same as Com. Exam. 9 |
| Foam property | | | | | | | | |
| Overall density (kg/m$^3$) | | 52.5 | 52.3 | 50.0 | 52.0 | 51.7 | 51.6 | 52.0 |
| 25% ILD (kg/314 cm$^2$) | | 22.5 | 22.1 | 22.7 | 19.5 | 20.0 | 22.4 | 22.9 |
| Tensile strength (kg/cm$^2$) | | 1.42 | 1.35 | 1.32 | 1.20 | 1.24 | 1.25 | 1.25 |
| Tear resistance (kg/cm) | | 0.72 | 0.68 | 0.65 | 0.55 | 0.56 | 0.56 | 0.55 |
| Elongation (%) | | 120 | 115 | 117 | 90 | 104 | 109 | 110 |
| Impact resilience (%) | | 76 | 73 | 73 | 59 | 70 | 71 | 71 |
| 50% Compression set (%) (dry set) | | 1.3 | 1.5 | 1.5 | 6.3 | 3.0 | 3.0 | 2.9 |
| Transmissibility at 6 Hz | | 0.52 | 0.55 | 0.56 | 1.10 | 0.70 | 0.65 | 0.62 |

We claim:

1. A flexible high-resilience polyurethane foam obtained by reacting a mixture comprising:

(A) water as a blowing agent, (B) an organic polyisocyanate composition consisting of:
    (a) polymethylenepolyphenyl isocyanate represented by the formula (1):

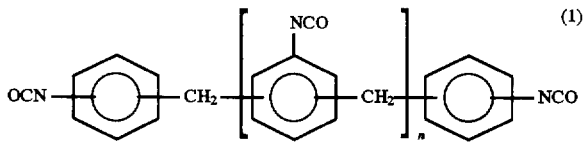

wherein n is 0 or an integer of 1 or more, the weight ratio of the three benzene ring compound (n=1) to the sum of the four or more benzene ring compound (n≧2) and the less active ingredient [three benzene ring compound]/[four or more benzene ring compound+less active ingredient] is 1.1 to 20.0, and the content of the two benzene ring compound (n=0) is from more than 60% by weight to 90% or less by weight, and (b) 2,4- and/or 2,6-tolylene diisocyanate in a ratio (a)/(b) of 97/3 to 80/20, and (C) an active hydrogen containing compound consisting of polyoxyalkylene polyol having a hydroxyl value of 10 to 35 mg KOH/g, monool content of 15 mol % or less, and a head-to-tail coupling selectivity of 96 mol % or more.

2. A flexible high-resilience polyurethane foam according to claim 1 wherein [three benzene ring compound]/[four or more benzene ring compound+less active ingredient] is 1.2 to 10.0 and the content of two benzene ring compound is from more than 60% by weight to 80% or less by weight.

3. A flexible high-resilience polyurethane foam according to claim 1 wherein [three benzene ring compound]/[four or more benzene ring compound+less active ingredient] is 2.0 to 4.0 and the content of two benzene ring compound is from more than 60% by weight to 80% or less by weight.

4. A flexible high-resilience polyurethane foam according to claim 1 wherein the ratio (a)/(b) is 95/5 to 85/15.

5. A flexible high-resilience polyurethane foam comprising using as an organic polyisocyanate composition an isocyanate terminated prepolymer obtained by reacting the organic polyisocyanate composition of claim 1 with a single compound or a mixture of polyoxyalkylene polyol having a molar addition polymerization ratio of an alkylene oxide having three or more carbon atoms to ethylene oxide of 60/40 to 15/85, average functionality of 2 to 4, and average molecular weight of 2,000 to 10,000.

6. A flexible high-resilience polyurethane foam according to claim 5 wherein polyoxyalkylene polyol has the molecular addition polymerization ratio of an alkylene oxide having 3 to 4 carbon atoms to ethylene oxide of 50/50 to 20/80, average functionality of 2 to 4, and average molecular weight of 3,000 to 8,000.

7. A flexible high-resilience polyurethane foam according to claim 1 wherein the active hydrogen containing compound (C) is obtained by addition polymerization of alkylene oxide on an active hydrogen containing compound having 3 to 8 hydroxyl groups in the presence of an alkali metal hydroxide catalyst.

8. A flexible high-resilience polyurethane foam according to claim 7 wherein the alkali metal catalyst is cesium hydroxide.

9. A flexible high-resilience polyurethane foam according to claim 1 wherein the active hydrogen containing compound (C) is polymer polyol obtained by portionally modifying polyalkylene polyol with polymerization of an ethylenically unsaturated monomer.

10. A process for preparing a flexible high-resilience polyurethane foam by reacting a mixture comprising:

(A) water as the blowing agent, (B) an organic polyisocyanate composition consisting of:
    (a) polymethylenepolyphenyl isocyanate represented by the formula (1):

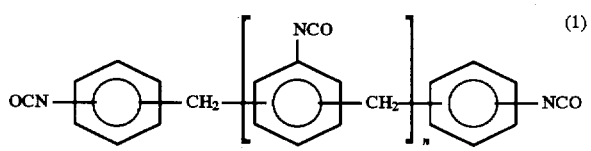

wherein n is 0 or an integer of 1 and more, the weight ratio of the three benzene ring compound (n=1) to the sum of the four or more benzene ring compound (n≧2) and the less active ingredient [three benzene ring compound]/[four or more benzene ring compound+less active ingredient] is 1.1 to 20.0, and the content of the two benzene ring compound (n=0) is from more than 60% by weight to 90% or less by weight, and (b) 2,4- and/or 2,6-tolylene diisocyanate in a ratio (a)/(b) of 97/3 to 80/20, and (C) an active hydrogen containing compound consisting of polyoxyalkylene polyol having a hydroxyl value of 10 to 35 mg KOH/g, monool content of 15 mol % or less, and a head-to-tail coupling selectivity of 96 mol % or more.

11. A process for preparing a flexible high-resilience polyurethane foam according to claim 10 wherein [three benzene ring compound]/[four or more benzene ring compound+less active ingredient] is 1.2 to 10.0 and the content of two benzene ring compound is from more than 60% by weight to 80% or less by weight.

12. A process for preparing a flexible high-resilience polyurethane foam according to claim 10 wherein [three benzene ring compound]/[four or more benzene ring compound+less active ingredient] is 2.0 to 4.0 and the content of two benzene ring compound is from more than 60% by weight to 80% or less by weight.

13. A process for preparing a flexible high-resilience polyurethane foam according to claim 10 wherein the ratio (a)/(b) is 95/5 to 85/15.

14. A process for preparing a flexible high-resilience polyurethane foam using as an organic polyisocyanate composition an isocyanate terminated prepolymer obtained by reacting the organic polyisocyanate composition of claim 10 with a single compound or a mixture of polyoxyalkylene polyol having a molar addition polymerization ratio of an alkylene oxide having three or more carbon atoms to ethylene oxide of 60/40 to 15/85, average functionality of 2 to 4, and average molecular weight of 2,000 to 10,000.

15. A cushion material obtained by molding the flexible high resilience polyurethane foam of claim 1.

16. A vehicle sheet comprised of the cushion material of claim 15.

* * * * *